(12) United States Patent
Chang et al.

(10) Patent No.: US 10,518,622 B1
(45) Date of Patent: Dec. 31, 2019

(54) INTEGRATED POWER MODULE OF ELECTRIC SCOOTER

(71) Applicant: FUKUTA ELECTRIC & MACHINERY CO., LTD., Taichung (TW)

(72) Inventors: Chin Feng Chang, Taichung (TW); Li Hsuan Huang, Taichung (TW); Hung Chun Ke, Changhua County (TW)

(73) Assignee: Fukuta Electric & Machinery Co., Ltd., Taichung (TW)

( * ) Notice: Subject to any disclaimer, the term of this patent is extended or adjusted under 35 U.S.C. 154(b) by 0 days.

(21) Appl. No.: 16/212,659

(22) Filed: Dec. 6, 2018

(51) Int. Cl.
*B60K 1/04* (2019.01)
*B60L 15/20* (2006.01)
*B62M 7/12* (2006.01)

(52) U.S. Cl.
CPC ............ *B60K 1/04* (2013.01); *B60L 15/2054* (2013.01); *B62M 7/12* (2013.01)

(58) Field of Classification Search
CPC ......... B60K 1/04; B62M 7/12; B60L 15/2054
See application file for complete search history.

(56) References Cited

U.S. PATENT DOCUMENTS

| | | | | |
|---|---|---|---|---|
| 5,048,626 A * | 9/1991 | Strehler | ............... | B60K 7/0007 180/19.2 |
| 6,158,543 A * | 12/2000 | Matsuto | ................... | B60K 6/36 180/220 |
| 9,038,756 B2 * | 5/2015 | Mazzini | ................... | B60K 1/02 180/65.7 |
| 2013/0307320 A1 * | 11/2013 | Akamatsu | ........... | B60L 15/2054 301/6.5 |
| 2015/0038277 A1 * | 2/2015 | Tamura | ................ | B60K 17/356 475/150 |
| 2015/0260145 A1 * | 9/2015 | Holmes | ................... | F02N 15/06 74/8 |
| 2015/0306954 A1 * | 10/2015 | Matsuura | ........... | B60K 17/3462 180/233 |
| 2016/0001649 A1 * | 1/2016 | Benjey | ..................... | B60K 6/48 477/5 |
| 2018/0162213 A1 * | 6/2018 | Colavincenzo | ........ | B60K 6/387 |
| 2018/0162355 A1 * | 6/2018 | Colavincenzo | ....... | B60W 20/13 |
| 2018/0162371 A1 * | 6/2018 | Colavincenzo | ....... | B60W 20/40 |
| 2018/0162374 A1 * | 6/2018 | Colavincenzo | ......... | B60L 58/20 |

* cited by examiner

*Primary Examiner* — Erez Gurari
(74) *Attorney, Agent, or Firm* — Wang Law Firm, Inc.

(57) ABSTRACT

An integrated power module of an electric scooter includes a motor unit and a transmission unit. The motor unit includes a motor case, in which a stator, a rotor and a shaft are provided. A board is fixed to an end of the motor case, and a holder is fixed to the board. The transmission unit has a lid connected to the board to form a lubricant chamber. The motor shaft passes through the holder to the lubricant chamber. The transmission unit further includes a transmission shaft, which is connected to the motor shaft through a pair of meshed gears. The motor shaft is provided with a spiral slot to force lubricant in the holder flowing to the lubricant room instead of flowing to the motor unit when the motor shaft is rotating.

10 Claims, 5 Drawing Sheets

INTEGRATED POWER MODULE OF ELECTRIC SCOOTER

BACKGROUND OF THE INVENTION

1. Technical Field

The present invention relates to an electric scooter, and more particularly to an integrated power module of an electric scooter.

2. Description of Related Art

Typically, a conventional electric scooter is equipped with a motor to be the power source. In order to reduce a size, a transmission device is mounted to the motor to form an integrated power module.

The transmission device usually includes at least a pair of meshed gears to transmit the power of the motor out. The transmission device is equipped with a lubrication system to keep the gears rotating normally. However, it causes a new problem.

A shaft of the motor will extend into the transmission device to have one of the gears connected thereto. As we know a lubricant is filled in the transmission device, and it has a risk that the lubricant will flow into the motor along the shaft. A conventional way to fix this problem is providing an oil seal on the shaft of motor. It is very hard to find that the oil seal may have problem because the oil seal is received in the integrated power module. It can be found only after the motor is damaged by the lubricant.

BRIEF SUMMARY OF THE INVENTION

In view of the above, the primary objective of the present invention is to provide an integrated power module of an electric scooter, which may prevent the lubricant from flowing into the motor when the motor is running.

In order to achieve the objective of the present invention, a integrated power module of an electric scooter includes a motor unit and a transmission unit. The motor unit includes a motor case, a rotor, a stator, and a motor shaft, wherein the motor case has a motor room therein, in which the rotor, the stator, and the motor shaft are provided. The motor case is provided with a board to seal the motor room. The board is provided with a bore. A holder, which is connected to the board, has a through hole aligned with the bore of the board. The motor shaft passes through the board of the board and the through hole of the holder. The transmission unit includes a lid, a transmission shaft, a first gear, and a second gear. The lid is connected to the motor case to form a lubricant room between the board and the lid. The lubricant room is filled with a lubricant. The lid is provided with a lid bore. The transmission shaft has a portion received in the lubricant room, and passes through the lid bore. The first gear is connected to the motor shaft, and the second gear is connected to the transmission shaft. The first gear is meshed with the second gear, so that the transmission shaft is driven to rotate by the motor unit. The motor shaft is provided with a spiral slot, a portion of which is received in the holder and the rest portion of which is received in the lubricant room. A spiraling direction of the spiral slot from an end in the holder to an opposite end in the lubricant room is the same as a rotating direction of the motor shaft.

In an embodiment, the holder has a chamber therein, and the spiral slot has a portion received in the chamber.

In an embodiment, the board is provided with a lubricant slot, a portion of which is received in the lubricant room, and the rest portion of which is received in the chamber of the holder.

In an embodiment, the holder has a first holder member and a second holder member connected to opposite sides of the board respectively; each of the first holder member and the second holder member has an opening, and the openings are aligned with the bore of the bore to form the through hole.

In an embodiment, each of the first holder member and the second holder member has a cavity, and the cavities face to each other to form a chamber between the first holder member and the second holder member.

In an embodiment, the board is provided with a lubricant slot to communicate the lubricant room with the chamber of the holder, so that the chamber is filled with the lubricant.

In an embodiment, the first holder member has a first half piece and a second haft piece connected to each other; the second holder member has a first half piece and a second haft piece connected to each other; a boundary of a connection of the first and the second half pieces of the first holder member is perpendicular to a boundary of a connection of the first and the second half pieces of the second holder member.

In an embodiment, the second holder member is provided with an annular slot, in which an O-ring is received; the O-ring presses the second holder member and the board.

In an embodiment, the board is provided with a shaft seat; the transmission shaft has an end rotatably connected to the shaft seat.

In an embodiment, an end of the motor shaft, which is received in the lubricant room, is rotatably connected to the lid.

As a result, the lubricant in the holder will be forced to flow to the lubricant room when the motor shaft is rotating to prevent the lubricant from flowing into the motor unit.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
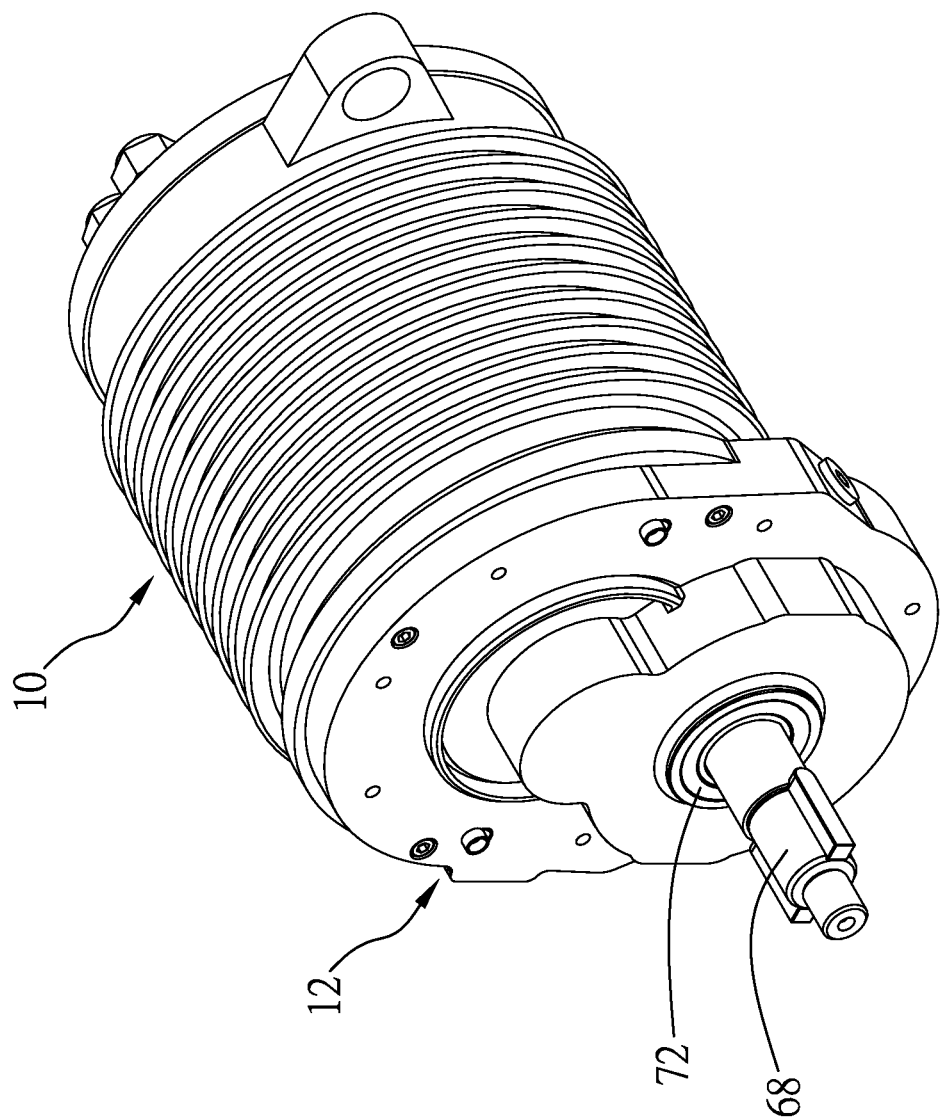
FIG. 1 is a perspective view of a preferred embodiment of the present invention.

FIG. 1 shows an integrated power module of an electric scooter of the preferred embodiment of the present invention, including a motor unit 10 and a transmission unit 12.

Figure 2:
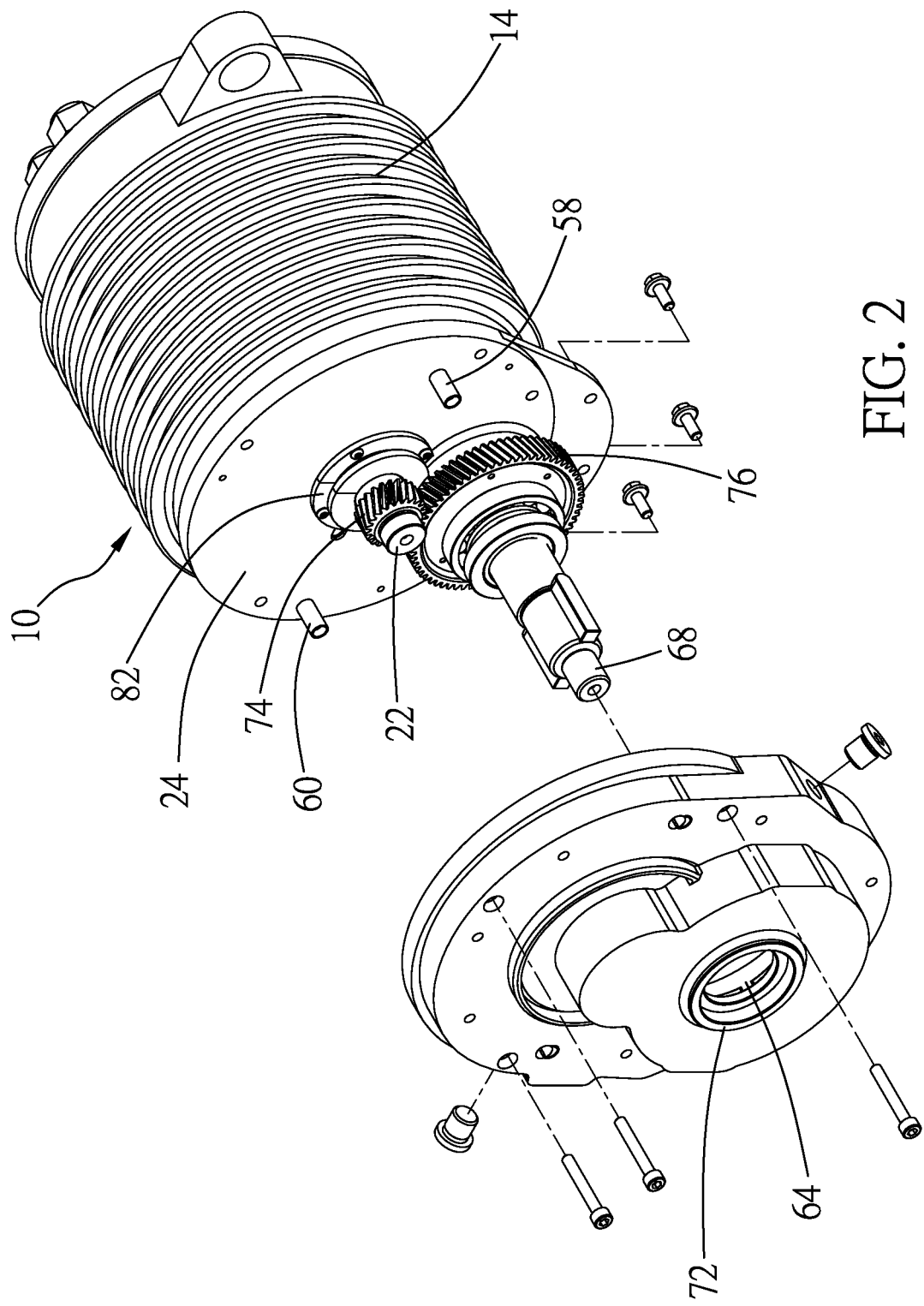
FIG. 2 is an exploded view of the preferred embodiment of the present invention.
Figure 4:
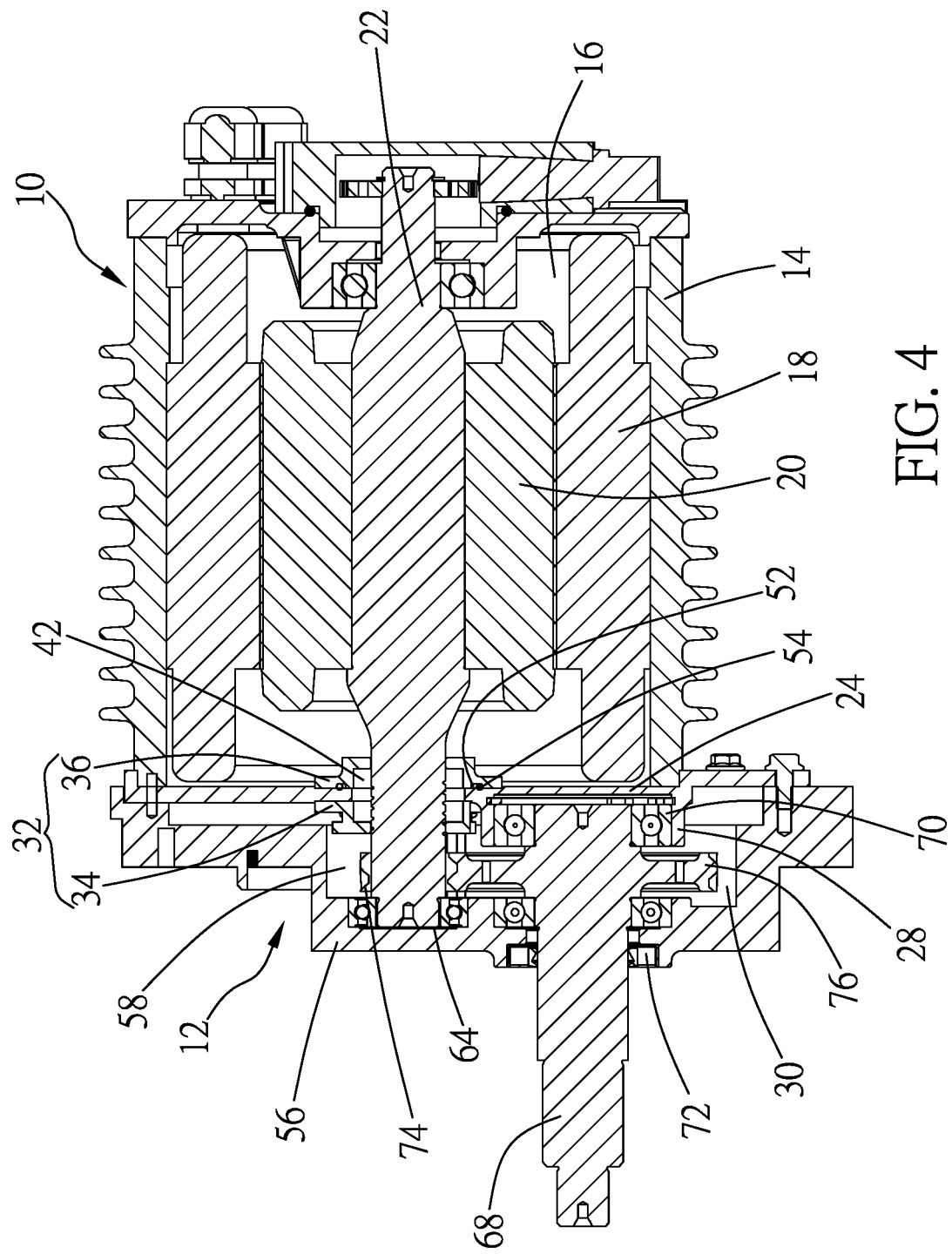
FIG. 4 is an exploded view of the preferred embodiment of the present invention, showing the board, the holder and the O-ring.

As shown in FIG. 2 and FIG. 4, the motor unit 10 includes a motor case 14, in which a motor room 16 is formed. A stator 18, a rotor 20, and a motor shaft 22 are received. The stator 18 is mounted on an interior side of the motor case 14. The motor shaft 22 is connected to the rotor 20 for rotation by the magnetic effect between the stator 18 and the rotor 20. The above elements are the same as prior arts, so we do not describe the detail here.

The motor case 14 is provided with a board 24 connected to an end thereof to seal the motor room 16. The board 24 has a bore 26, a shaft seat 28, and a lubricant slot 30. The shaft seat 28 has an annular wall on an exterior side of the board 24. The lubricant slot 30 is provided on the exterior side as well, and has an end extending to the bore 26. A holder 32 is connected to the board 24, which has a through hole aligned with the bore 26.

As shown in FIG. 4, the holder 32 has first holder member 34 and a second holder member 36. The first holder member 34 is a disk-like member, having a cavity on an interior side thereof and an opening 38 at a center thereof. The second holder member 36 is the same as the first holder member 34, having a cavity on an interior side thereof and an opening 40 at a center thereof. The first holder member 34 is connected to the exterior side of the board 24 while the second holder member 36 is connected to an interior side of the board 24. Both the openings 38, 40 of the first and the second holder members 34, 36 are aligned with the bore 26 of the board 24 to form the through hole of the holder 32. The cavities of the first and the second holder members 34, 36 face to each other to form a chamber 42 in the holder 32. The bore 26 of the board 24 is received in the chamber 42 of the holder 32, and the lubricant slot 30 has a portion left out of the holder 32, and the rest portion of the lubricant slot 30 is received in the chamber 42 of the holder 32.

The motor shaft 22 of the motor unit 10 extends through the opening 40 of the second holder member 36, the chamber 42, the bore 26 of the board 24, and the opening 38 of the second holder member 34 in sequence. Gaps between the motor shaft 22 and edges of the openings 38, 40 are about 0.2 mm, which is much smaller than a gap between the motor shaft 22 and a sidewall of the chamber 42.

The first holder member 34 is formed by a first half piece 44 and a second haft piece 46, and both the first and the second half pieces 44, 46 are semi-circular members. The second holder member 36 is the same as the first holder member 34, having a semi-circular first half piece 48 and a semi-circular second haft piece 50. In the present embodiment, a boundary of a connection of the first and the second half pieces 44, 46 of the first holder member 34 is perpendicular to a boundary of a connection of the first and the second half pieces 48, 50 of the second holder member 36.

The second holder member 36 is provided with an annular slot 52 on the interior side thereof, in which an O-ring 54 is received. The O-ring 54 presses the second holder member 36 and the interior side of the board 24 to form an airtight condition.

Figure 3:
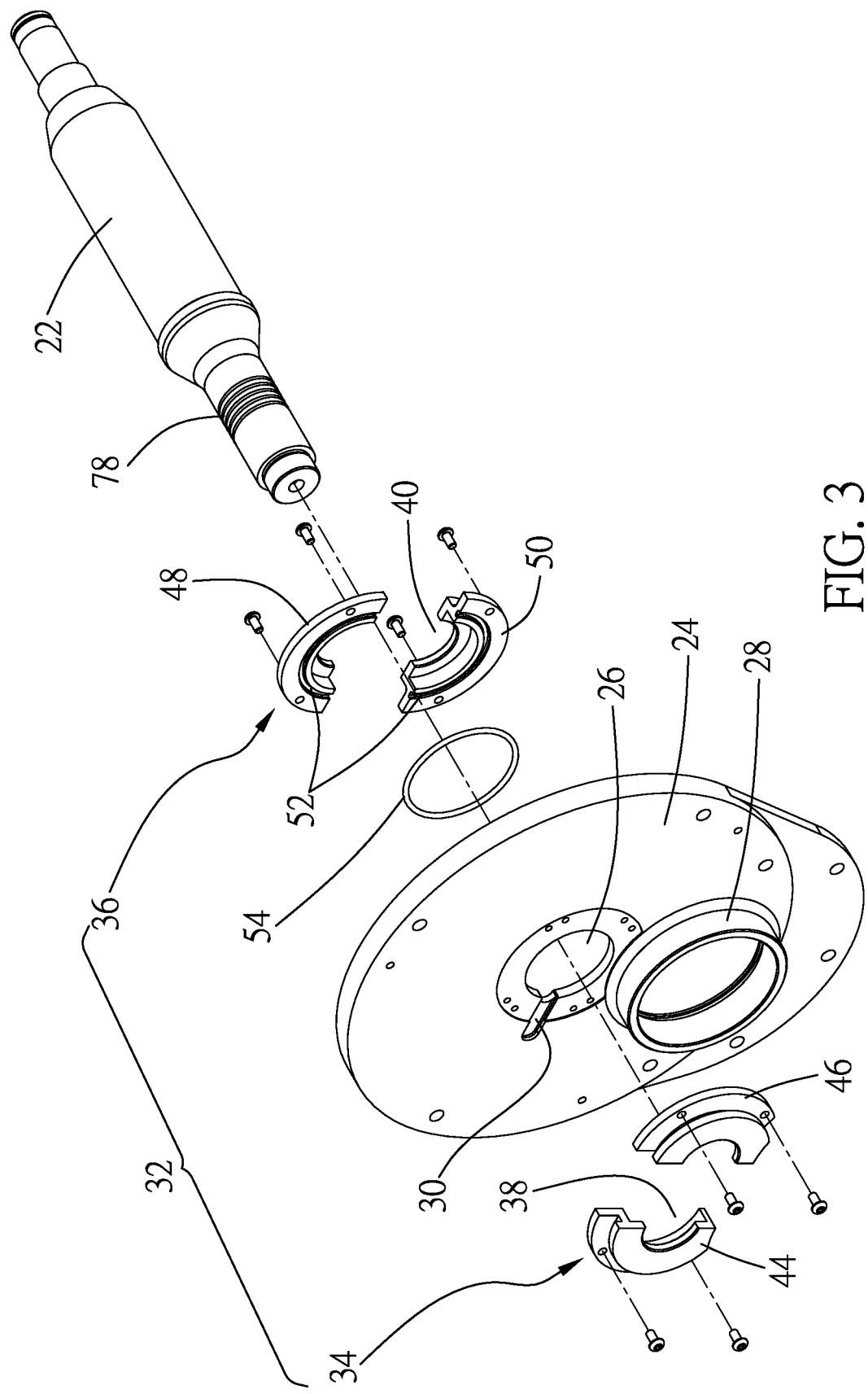
FIG. 3 is a sectional view of the preferred embodiment of the present invention.

As shown in FIG. 2 and FIG. 3, the transmission unit 14 has a lid 56 connected to the board 24 to form a lubricant room 58 therebetween. Two pipes 60, 62 pass through the motor case 14 and extend into the lubricant room 58. The pipes 60, 62 provide a lubrication circulation, so that the lubricant room 58 is filled with a circulating lubricant. A distal end of the motor shaft 22 is received in the lubricant room 58, and is rotatably connected to the lid 56 through a bearing 66.

The transmission unit 14 has a transmission shaft 68 having an end rotatably connected to the shaft seat 28 through a bearing 70. The lid 56 is provided with a lid bore 64, and the transmission shaft 68 passes through the lid bore 64. A bearing 72 is received in the lid bore 64 and fitted to the transmission shaft 68. With the support of the shaft seat 28 and the bearing 72 in the lid bore 64 the transmission shaft 68 mat rotate stably.

The transmission unit 14 further has a first gear 74 and a second gear 76, both of which are received in the lubricant room 58. The first gear 74 is connected to motor shaft 22, and the second gear 76 is connected to the transmission shaft 68. The first gear 74 is meshed with the second gear 76, so that the transmission shaft 68 is driven to rotate by the motor unit 10.

Figure 5:
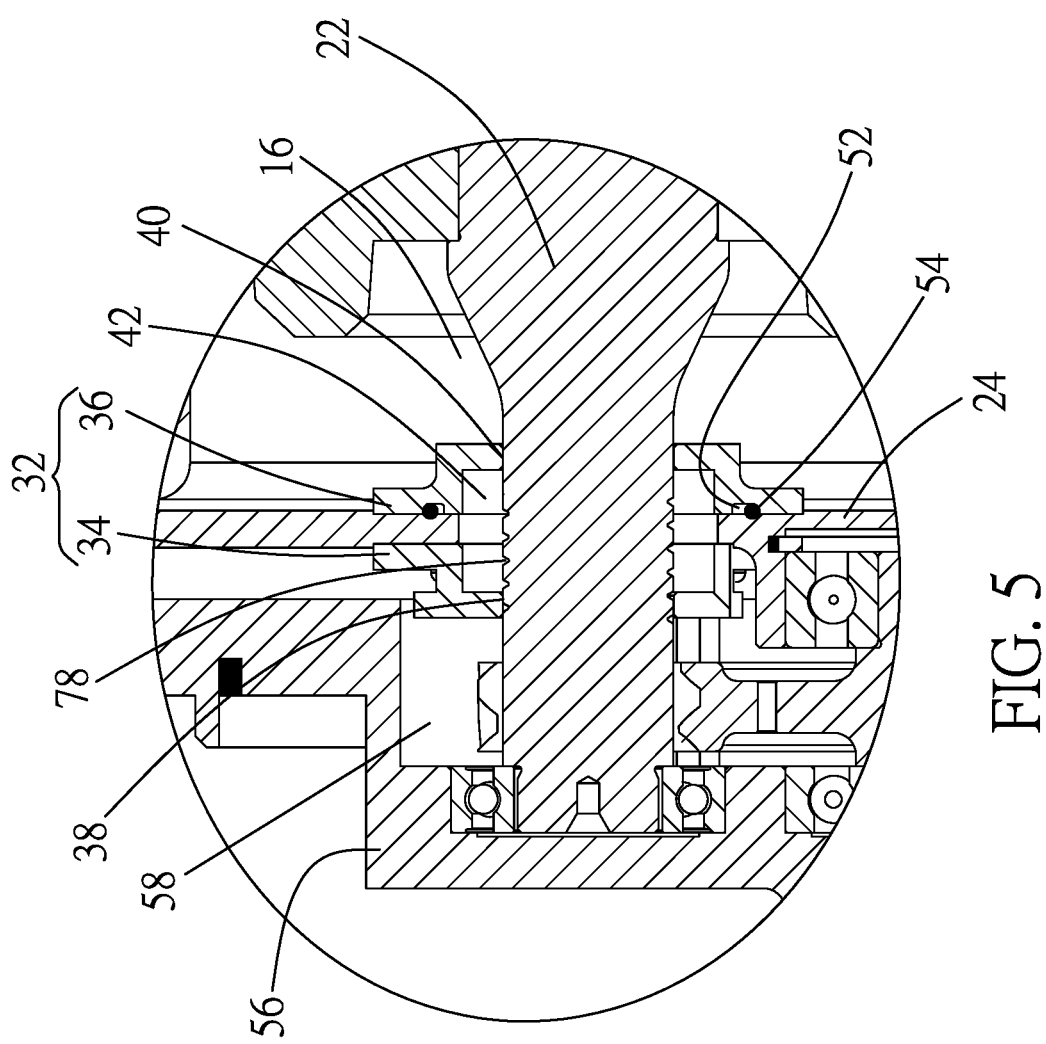
FIG. 5 is a sectional view of the preferred embodiments of the present invention, showing the board, the holder and the O-ring.

As shown in FIG. 5, the motor shaft 22 is provided with a spiral slot 78, a portion of which is received in the chamber 42 of the holder 32 and the rest portion of which is received in the lubricant room 58. A spiraling direction of the spiral slot 78 from an end in the chamber 42 to an end in the lubricant room 58 is the same as a rotating direction of the motor shaft 22. The spiral slot 78 generates a positive pressure to force the lubricant in the chamber 42 flowing to the lubricant room 58 via the gap between the edge of the opening 38 and the motor shaft 22, and the lubricant enters the chamber 42 via the lubricant slot 30. The positive pressure is increasing while the speed of the motor shaft 22 is increasing, so that the lubricant will have less chance to flow into the motor room 16 via the gap between the motor shaft 22 and the edge of the opening 40.

It must be pointed out that the embodiments described above are only some preferred embodiments of the present invention. All equivalent structures which employ the concepts disclosed in this specification and the appended claims should fall within the scope of the present invention.

What is claimed is:

1. An integrated power module of an electric scooter, comprising:
    a motor unit including a motor case, in which a rotor, a stator, and a motor shaft are provided, wherein the motor case has a board at an end thereof, and the board is provided with a bore; a holder, which is connected to the board, has a through hole aligned with the bore of the board; the motor shaft passes through the bore of the board and the through hole of the holder; and
    a transmission unit including a lid, a transmission shaft, a first gear, and a second gear, wherein the lid is connected to the motor case to form a lubricant room between the board and the lid; the lubricant room is filled with a lubricant; both the transmission shaft and the motor shaft have at least a portion received in the lubricant room; the first gear is is received in the lubricant room and connected to the motor shaft, and the second gear is is received in the lubricant room and connected to the transmission shaft; the first gear is meshed with the second gear, so that the transmission shaft is driven to rotate by the motor unit;
    wherein the motor shaft is provided with a spiral slot, a portion of which is received in the holder and the rest portion of which is received in the lubricant room; a spiraling direction of the spiral slot from an end in the holder to an end in the lubricant room is the same as a rotating direction of the motor shaft.

2. The integrated power module of the electric scooter of claim 1, wherein the holder has a chamber therein, and the spiral slot has a portion received in the chamber.

3. The integrated power module of the electric scooter of claim 2, wherein the board is provided with a lubricant slot to communicate the lubricant room with the chamber of the holder.

4. The integrated power module of the electric scooter of claim 1, wherein the holder has a first holder member and a second holder member, which are connected to opposite sides of the board respectively; each of the first holder member and the second holder member has an opening, and the openings are aligned with the bore of the board to form the through hole.

5. The integrated power module of the electric scooter of claim 4, wherein each of the first holder member and the second holder member has a cavity, and the cavities face to each other to form a chamber.

6. The integrated power module of the electric scooter of claim 5, wherein the board is provided with a lubricant slot to communicate the lubricant room with the chamber of the holder, so that the chamber is filled with the lubricant.

7. The integrated power module of the electric scooter of claim 4, wherein the first holder member has a first half piece and a second haft piece connected to each other; the second holder member has a first half piece and a second haft piece connected to each other; a boundary of a connection of the first and the second half pieces of the first holder member is perpendicular to a boundary of a connection of the first and the second half pieces of the second holder member.

8. The integrated power module of the electric scooter of claim 4, wherein the second holder member is provided with an annular slot, in which an O-ring is received; the O-ring presses the second holder member and the board.

9. The integrated power module of the electric scooter of claim 1, wherein the board is provided with a shaft seat; the transmission shaft has an end rotatably connected to the shaft seat.

10. The integrated power module of the electric scooter of claim 1, wherein an end of the motor shaft, which is received in the lubricant room, is rotatably connected to the lid.

\* \* \* \* \*